United States Patent [19]
Hemme

[11] 3,729,683
[45] Apr. 24, 1973

[54] VOR 9960 HZ HARMONIC GENERATOR

[75] Inventor: William R. Hemme, Fairmont, Minn.

[73] Assignee: Collins Radio Company, Cedar Rapids, Iowa

[22] Filed: Sept. 3, 1971

[21] Appl. No.: 177,716

[52] U.S. Cl. ...................328/16, 328/14, 328/18, 328/23
[51] Int. Cl. ............................................H03b 21/02
[58] Field of Search....................328/14, 16, 17, 18, 328/23; 84/1.11, 1.12, 1.19, 1.20, 1.21, 2.20

[56] References Cited

UNITED STATES PATENTS

| | | | |
|---|---|---|---|
| 2,894,133 | 7/1959 | Bolie | 328/16 X |
| 3,007,361 | 11/1961 | Wayne | 84/1.2 X |
| 3,125,729 | 3/1964 | Stone et al. | 328/18 X |
| 3,245,001 | 4/1966 | Barber | 328/14 X |
| 3,355,539 | 11/1967 | Munch et al. | 328/17 X |
| 3,495,158 | 2/1970 | Garnett et al. | 328/16 X |
| 3,568,034 | 3/1971 | Shenfeld | 328/16 X |

*Primary Examiner*—John S. Heyman
*Attorney*—Richard W. Anderson et al.

[57] ABSTRACT

A controlled harmonic generation technique is applied to the 9960 Hz subcarrier signal related to VOR navigation by means separably applying a 30 Hz variable phase test signal and a 9,960 Hz subcarrier reference phase signal employed in the VOR navigation system to a harmonic generating means which acts on the 9,960 Hz subcarrier alone by generating predetermined levels of harmonics of the subcarrier with subsequent linear recombination of the controlled level harmonic components with a 9,960 Hz fundamental signal devoid of such harmonics and the 30 Hz variable phase signal. A selectively controlled composite modulation signal which simulates the modulation from actual VOR ground transmitting stations is thus provided.

6 Claims, 3 Drawing Figures

Patented April 24, 1973   3,729,683

VOR 9960 HZ HARMONIC GENERATOR

This invention relates generally to signal generating devices and more particularly to an improved signal harmonic generator by means of which selectively controlled levels of predetermined harmonics of a base frequency may be generated.

In the specific embodiment to be exemplified, the present invention resides in the provision of a 9,960 Hz harmonic generator for usage in test equipment for testing variable omnirange (VOR) receivers by providing a means for presenting to the receiver a controlled amount of distortion simulating the modulation components from actual VOR ground transmitting stations so that the test represents as closely as possible the various signal environments in which the receiver may be required to function.

Accordingly, a primary object of the present invention is the provision of a harmonic generator by means of which an undistorted base frequency and preselected levels of various harmonics of the base frequency may be generated.

The present invention is featured in the application of controlled harmonic generation techniques to the 9,960 Hz subcarrier signal related to VOR navigation by means separably applying a 30 Hz variable phase test signal and a 9,960 Hz subcarrier reference phase signal employed in the VOR navigation system to a harmonic generating means the latter means acting on the 9,960 Hz subcarrier alone, selectively generating predetermined levels of harmonics of the subcarrier; and subsequently recombining the controlled level harmonic components with the reference variable phase signal to provide a selectively controlled composite modulation signal simulating the modulation from actual VOR ground transmitting stations.

The harmonic generator of the present invention is featured in the provision of high gain limiting, positive slope differentiation, and multiple harmonic bandpass filtering techniques, with individual level adjusted harmonic filter outputs being linearly combined with a "clean" base or fundamental signal devoid of such harmonics to provide a VOR modulation signal with precisely controllable harmonic levels.

These and other features and objects of the present invention will become apparent upon reading the following description with reference to the accompanying drawing in which.

The Federal Aviation Administration has announced intent to begin commissioning VOR ground stations on 50 kHz channels in the near future. Present VOR ground stations operate on 100 kHz spaced channels. With the advent of 50 kHz spaced channels, existing VOR receivers are known to be vulnerable to particular adjacent channel harmonic reception to generate false VOR bearing indications. Tests have indicated that performance of VOR receivers to strong 50 kHz adjacent channel VOR signals is very much a function of the 9,960 Hz subcarrier harmonic sidebands of the strong adjacent signal. That is, a VOR receiver may indicate a false bearing signal, may receive an audible identification signal, and may fail to properly flag when the receiver is mistuned by 50 kHz from a strong VOR signal and when there is not a VOR signal on the channel to which the receiver is tuned. A particular monitoring arrangement by means of which this situation may be monitored and annunciated is described and claimed in my co-pending application, Ser. No. 61,594, entitled "VOR Adjacent Channel Sensor" filed Aug. 7, 1970, and assigned to the assignee of the present invention.

The harmonic generator of the present invention, as will herein be described, provides a means for testing VOR receivers for their susceptibility to the above described and referenced adjacent channel VOR signals. More particularly, the generator to be described provides a means for presenting to the receiver to be tested precisely controlled amounts of 9,960 Hz subcarrier harmonic distortion. As above discussed, the generator provides a controlled amount of distortion simulating the modulation from actual VOR ground stations so that the test may represent as closely as possible the signal environment in which the receiver is required to function. The maximum 9,960 Hz subcarrier harmonic levels that a VOR ground transmitting station is permitted to emanate are defined by ICAO Annex 10 as follows:

| 9960 Hz | 0 db (REF) |
|---|---|
| Second harmonic | −30 db |
| Third harmonic | −50 db |
| Fourth harmonic | −60 db |

The harmonic generator of the present invention provides a means to simulate the modulation from a VOR ground station and thereby a VOR receiver susceptibility to 9,960 Hz subcarrier harmonics from a strong adjacent channel signal can be tested.

Figure 1:
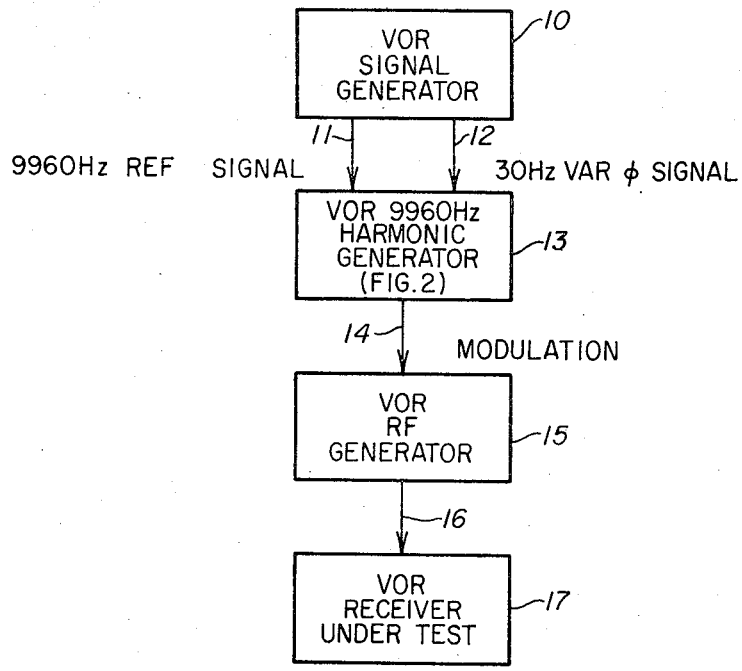
FIG. 1 is a generalized block diagram of a VOR test arrangement employing a harmonic generator in accordance with the present invention.

With reference to FIG. 1, the VOR 9,960 Hz harmonic generator provided by the present invention may be inserted between a VOR signal generator 10 (such as a Collins type 479S-3) and a VOR RF generator 15 (such as a Boonton 211A) such that control harmonic generation of the 9,960 Hz subcarrier can be accomplished. VOR signal generator 10 provides a 9,960 Hz reference phase signal conventionally frequency modulated at a 30 Hz rate on output 11. A 30 Hz variable phase signal is provided on output line 12 and each of the reference and variable phase signals 11 and 12 are applied as inputs to the harmonic generator 13 of the present invention. The 30 Hz variable phase signal 12 and the 9,960 Hz subcarrier reference phase signal 11 must be applied separately to the harmonic generator 13 such that the 9,960 Hz subcarrier can be acted on alone. The 9,960 Hz subcarrier, its harmonics, and the 30 Hz variable phase signal, as will be described, are recombined in the harmonic generator 13 to form a controllable composite modulation signal 14 for application to the VOR RF generator 15, the latter being employed to supply the carrier frequency in any one of 50 kHz steps within the VOR defined frequency range of 108–118 MHz. The output 16 from the RF generator 15 thus simulates an actual received VOR signal from a ground station for application to a VOR receiver 17 which may be under test. The harmonic generator 13 of the present invention as will be further described provides a means for selectively and precisely controlling the levels of predetermined harmonics of the 9,960 Hz reference phase subcarrier such that the receiver vulnerability to particular levels of these false VOR bearing introducing distortions may be completely checked out.

Figure 2:
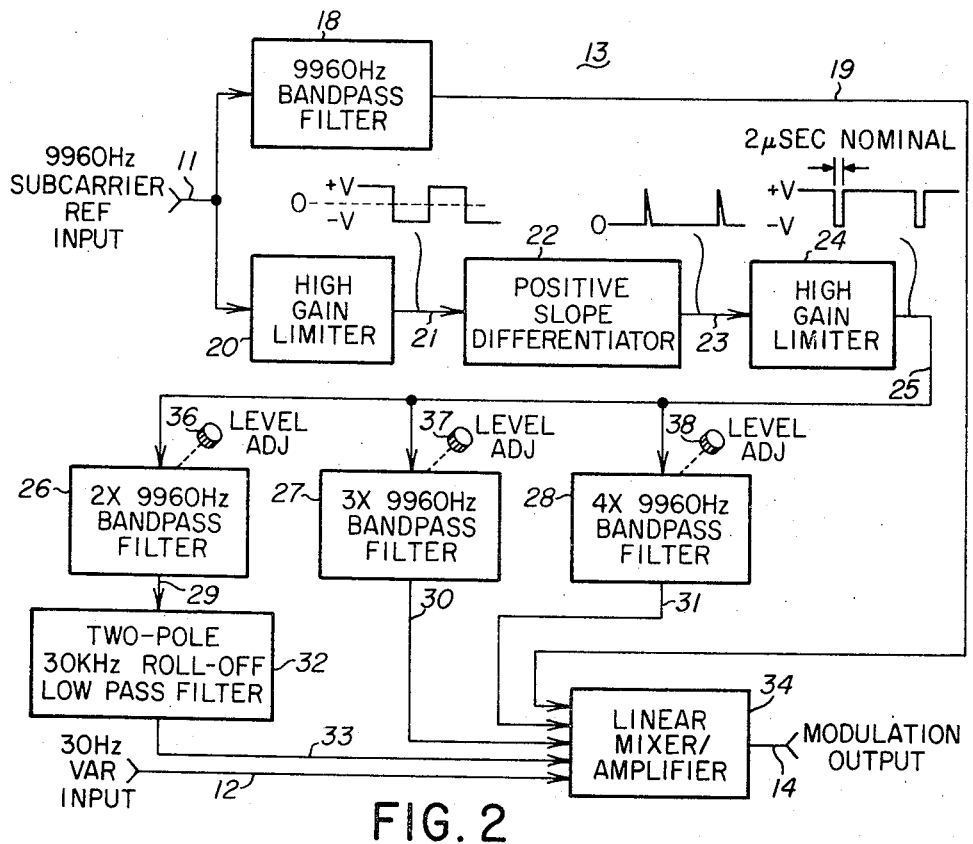
FIG. 2 is a functional block diagram of a VOR 9,960 Hz harmonic generator embodiment in accordance with the present invention.

A functional block diagram of the VOR 9,960 Hz harmonic generator of the present invention is illustrated in FIG. 2. The 9,960 Hz subcarrier frequency, modulated so as to contain the 30 Hz reference phase signal of a VOR transmission, is identified as input 11 to the harmonic generator. Input signal 11 is applied to a 9,960 Hz bandpass filter 18 such that the output 19 from the bandpass filter is a signal from which subcarrier harmonics generated by the VOR signal generator supplying the input 11 are eliminated. Thus, the output 19 from filter 18 is a "clean" 9,960 Hz subcarrier reference devoid of harmonics. This is necessary such that the harmonic generator has absolute control over the 9,960 Hz subcarrier harmonics to be subsequently combined with this clean signal 19.

The 9,960 Hz subcarrier input 11 as supplied by VOR signal generator is additionally applied to a high gain limiter 20 which generates a 9,960 Hz subcarrier square wave 21 rich in odd harmonics. The square wave output 21 from high gain limiter 20 is applied to a positive slope differentiator 22 (that is, is differentiated on one slope only) so that even harmonic energy can be generated. The resulting pulses 23 from the positive slope differentiator 22 are applied to a further high gain limiter 24 and the output 25 from high gain limiter 24 is, as indicated in FIG. 2, a nominal width pulse having a repetition rate equal to the instantaneous frequency of the frequency modulated 9,960 Hz subcarrier signal. The pulses 25 at the output of high gain limiter 24 are now rich in second, third, fourth, and higher harmonics of the 9,960 Hz subcarrier.

The pulse energy, rich in harmonics, developed in high gain limiter 24, is applied to separate bandpass filters. A first bandpass filter 26 receives the pulse train 25 and is tuned at the second harmonic of the 9,960 Hz signal. A second bandpass filter 27 receives the pulse train 25 and is tuned at the third harmonic of the 9,960 Hz signal. A third bandpass filter 28 receives the pulse train 25 and is tuned at the fourth harmonic of the 9,960 Hz signal. The output 29 from the second harmonic bandpass filter 26 is additionally applied to a two pole, 30 kHz roll-off low pass filter 32 to provide additional rejection of fourth harmonic energy. The bandpass filters 26, 27, and 28 are indicated functionally as including respective level adjust controls 36, 37, and 38. These gain controls incorporated with each of the bandpass filters 26, 27, and 28 permit independent adjustment of the levels of the second, third, and fourth harmonic outputs from the filters.

The filtered 9,960 Hz subcarrier 19 (devoid of harmonics) and the controllable level second, third, and fourth harmonics of the 9,960 Hz subcarrier (33, 30, and 31, respectively) together with the 30 Hz variable phase signal 12 from the VOR signal genrator are applied to a linear mixer/amplifier 34 from which is developed the composite modulation signal 14 containing the 30 Hz variable phase signal, the 9,960 Hz reference phase subcarrier, and independently level controlled second, third, and fourth harmonics of the 9,960 Hz reference.

Figure 3:
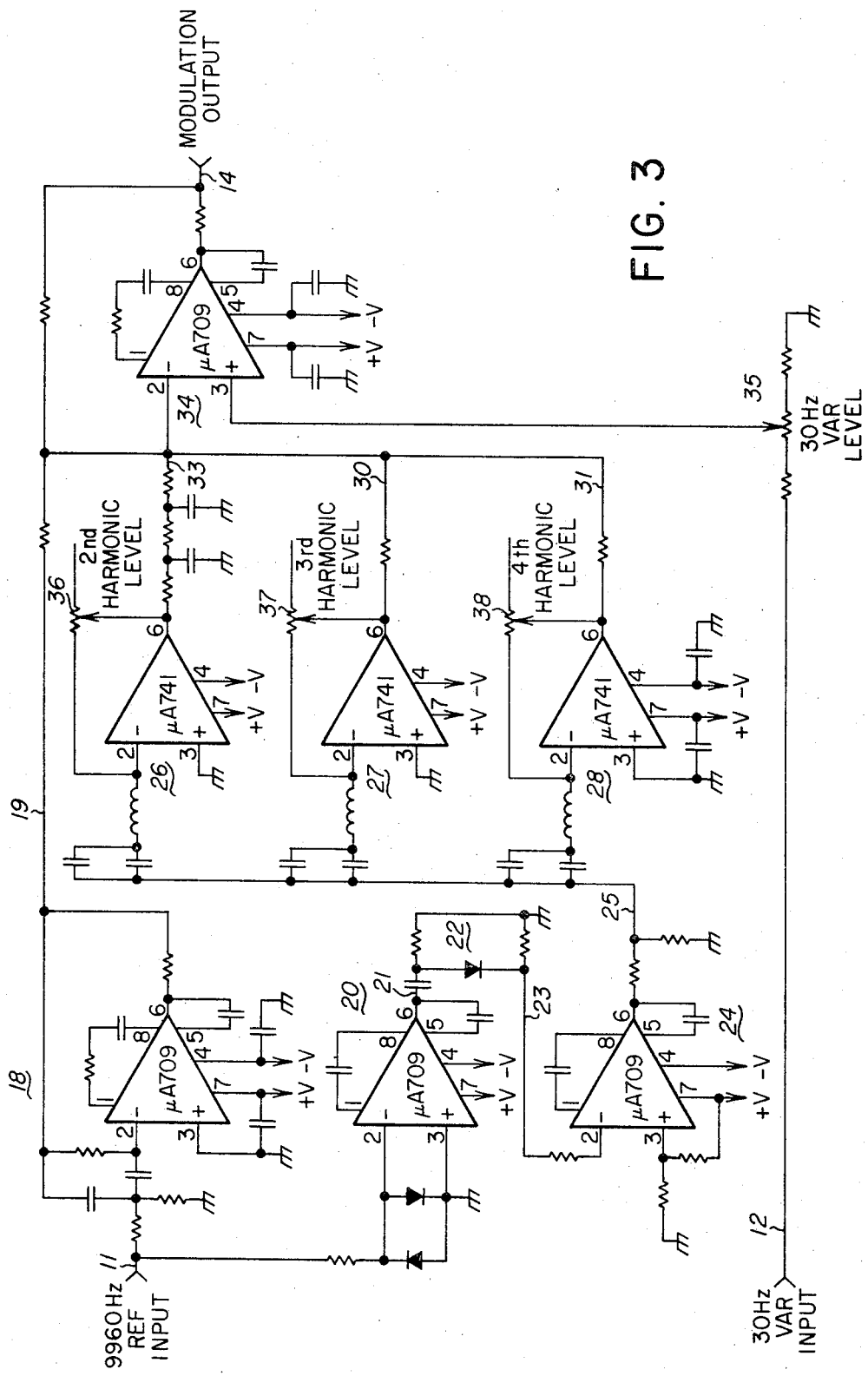
FIG. 3 is a functional schematic diagram of a particular embodiment of a 9,960 Hz harmonic generator in accordance with the present invention.

A functional schematic diagram of an embodiment of a harmonic generator in accordance with the present invention is shown in FIG. 3. The 9,960 Hz bandpass filter 18 is illustrated as being implemented with a commercially available type $\mu$A709 functional element to provide the bandpass filtering function to which the 9,960 Hz subcarrier reference input is applied. High gain limiter 20 is implemented with a further commercially available type $\mu$A709 functional element from which the square wave signal 21 is developed. High gain limiter 20 is followed by a conventional positive slope differentiator network 22 with the output 23 thereof being applied to the high gain limiter 24, also implemented from a commercially available type $\mu$A709 functional element. The pulse train 25 from high gain limiter 24, rich in harmonics, is applied through three controllable gain bandpass filters 26, 27, and 28, each implemented with a commercially available type $\mu$A741 functional element, with independent level adjust effected by variable resistance members 36, 37, and 38, respectively. The two pole, 30 kHz roll-off low-pass filter 32 is seen to be embodied as an RC filter network. The output 33 from filter 32, the output 30 from the third harmonic bandpass filter 27, and the output 31 from the fourth harmonic bandpass filter 28 are linearly mixed and applied to an amplifier 34, the latter implemented with a further commercially available type $\mu$A709 functional element.

The 30 Hz variable phase input signal 12, which would be supplied to the harmonic generator from an external source such as VOR signal generator 10 of FIG. 1, is applied to a further level control network 35 to permit selected level application of the 30 Hz variable phase signal to the output amplifier 34. The output 14 from amplifier 34 comprises the composite VOR modulation signal including a 30 Hz variable phase signal, a 9,960 Hz reference phase input signal, and precisely selected levels of the second, third, and fourth harmonics of the 9,960 Hz reference signal.

The present invention thus provides a harmonic generator from which is supplied controlled amounts of 9,960 Hz subcarrier harmonic distortion for usage in testing the vulnerability of VOR receivers to these distortions.

Although the present invention has been described with respect to a particular embodiment thereof, it is not to be so limited. The invention has been described in the environment of a 9,960 Hz harmonic generator for usage in VOR receiver testing since there exists a present and urgent need for such a test capability. It is to be realized that the present invention might equally be applicable to the generation of other frequency signals and selected level harmonics thereof for other purposes, thus changes might be made in the present invention as described which fall within the scope of the present invention as defined in the appended claims.

I claim:

1. Means for generating a composite signal comprising a fundamental frequency and selectively controllable levels of predetermined harmonics of said fundamental frequency from a fundamental frequency generating source, comprising first frequency selective means receiving said source frequency and producing a first output signal comprised of said fundamental frequency devoid of harmonics, harmonic frequency generation means receiving said source frequency and developing a square wave output signal having a periodicy defined by said source signal and rich in odd and even harmonics of said source signal, said harmonic frequency generating means comprising a first high gain limiter to which said source input signal is applied, a positive slope differentiator to which the output from said first high gain limiter is applied as input, and a further high gain limiter to which the output from said positive slope differentiator is applied as input, a plurality of further frequency selective devices to which the output from said further high gain limiter is commonly applied, said plurality of further frequency selective devices respectively passing frequency components corresponding to the second and successively higher harmonics of the said source frequency, and means for linearly mixing the outputs from said first frequency selective device and each of said further frequency selective devices the output from said means for mixing comprising an output signal comprised of said source signal fundamental frequency and the predetermined harmonics thereof as developed by successive ones of said further frequency selective devices.

2. Means as defined in claim 1 wherein each of said further frequency selective devices includes means for adjusting the signal output level therefrom.

3. Means as defined in claim 1 wherein each of said first and further frequency selected devices comprises a bandpass filter.

4. Means as defined in claim 2 wherein each of said first and further frequency selected devices comprises a bandpass filter.

5. Means as defined in claim 1 comprising a still further frequency selected device receiving the output from that one of said further frequency selected devices passing the second harmonic of said source frequency fundamental, said still further frequency selective device providing suppression of the second harmonic output of said second harmonic frequency selective device, and the output from said still further frequency selective device being applied to said mixing means.

6. Means as defined in claim 2 comprising a still further frequency selected device receiving the output from that one of said further frequency selected devices passing the second harmonic of said source frequency fundamental, said still further frequency selective device providing suppression of the second harmonic output of said second harmonic frequency selective device, and the output from said still further frequency selective device being applied to said mixing means.

* * * * *